US007037203B2

(12) United States Patent
Brandemuehl

(10) Patent No.: US 7,037,203 B2
(45) Date of Patent: May 2, 2006

(54) ADAPTER DEVICE FOR ADAPTING A WORM GEAR

(75) Inventor: Robert Brandemuehl, Waukesha, WI (US)

(73) Assignee: Durst Power Transmission Products, a division of Regal-Beloit Corporation, Beloit, WI (US)

( * ) Notice: Subject to any disclaimer, the term of this patent is extended or adjusted under 35 U.S.C. 154(b) by 63 days.

(21) Appl. No.: 10/295,009

(22) Filed: Nov. 14, 2002

(65) Prior Publication Data

US 2004/0096270 A1 May 20, 2004

(51) Int. Cl.
*B25G 3/28* (2006.01)
*F16H 1/16* (2006.01)

(52) U.S. Cl. ...................... 464/179; 403/344; 403/356; 74/425

(58) Field of Classification Search ................ 464/179, 464/107, 108; 74/425; 403/344, 355, 356
See application file for complete search history.

(56) References Cited

U.S. PATENT DOCUMENTS 1,212,608 A * 1/1917 Calkins ........................ 74/446
2,341,272 A * 2/1944 Firth et al. .................. 474/170
2,937,042 A * 5/1960 Wilder, Jr. .................. 403/354
2,946,611 A * 7/1960 Moyer ........................ 403/356
2,976,702 A * 3/1961 Pictsch ........................ 464/160
3,023,034 A * 2/1962 Jackson ....................... 403/366
3,156,589 A * 11/1964 Klement ..................... 148/522
3,159,047 A * 12/1964 Dable .......................... 74/450
4,040,757 A * 8/1977 Pauli .......................... 403/356
4,220,053 A * 9/1980 Barlow et al. ................ 74/425
5,553,966 A * 9/1996 Morelli et al. .............. 403/355
5,572,906 A * 11/1996 J org ........................... 74/425
5,951,198 A * 9/1999 Phillips ...................... 403/369
6,470,766 B1 * 10/2002 Ohta et al. .................... 74/425
6,682,432 B1 * 1/2004 Shinozuka ................... 464/78

* cited by examiner

*Primary Examiner*—Kenneth Thompson
(74) *Attorney, Agent, or Firm*—David J. Archer

(57) ABSTRACT

An adapter device is disclosed for adapting a drive of a worm gear to rotate an output shaft. The adapter device includes a sleeve having an inside diameter which is slightly greater than an outside diameter of the output shaft. The sleeve has an outer diameter which is slightly less than an inner diameter of the drive of the worm gear. An elongate key cooperates with a longitudinal slot defined by the output shaft and an aligned channel defined by the sleeve and an aligned groove defined by the drive of the worm gear. The sleeve is disposed between the output shaft and the drive of the worm gear, the sleeve, the output shaft and the drive of the worm gear being coaxial relative to each other. The arrangement is such that when the drive of the worm gear rotates, the key interacts with the aligned groove of the drive of the worm gear, the channel of the sleeve and the longitudinal slot of the output shaft for rotating the output shaft.

21 Claims, 6 Drawing Sheets

ADAPTER DEVICE FOR ADAPTING A WORM GEAR

BACKGROUND OF THE INVENTION

Field of the Invention

The present invention relates to an adapter device for adapting a worm gear. More specifically, the present invention relates to an adapter device for adapting a drive of a worm gear to rotate output shafts having various outside diameters.

Worm gears are used in many different applications including salt and sand spreaders for road maintenance, forage wagons and manure spreaders in the farm industry and for lime spreaders.

However, in the known worm gears, an output shaft is provided as an integral part of the worm gear and the installation of such worm gear requires the provision of the correct size output shaft for a particular piece of equipment that is to be driven by the worm gear. In view of the many different applications for such worm gears, it has been necessary to manufacture many different types of worm gear and shafts in order to meet the requirements of an end user of the worm gear.

The present invention overcomes the inconvenience of the aforementioned known arrangements by the provision of an adapter device which includes several sleeves for directly coupling the drive of the worm gear to an output shaft connected to the machinery.

More specifically, according to the present invention, an output shaft is not provided as an integral part of the worm gear. Rather, the output shaft, which may be provided in various sizes according to the required application, is provided as a separate item from the worm gear. When an appropriate diameter output shaft has been selected, one end of the selected output shaft is inserted into an adapter sleeve and a key is inserted within a channel defined by the sleeve and into an aligned longitudinal slot defined by the selected output shaft. The output shaft and sleeve assembly are then inserted into a hollow cavity defined by the drive of the worm gear so that the key engages and slides along an aligned groove defined by the hollow cavity. Accordingly, for a particular worm gear module, several different size output shafts may be driven dependent on the size of the sleeve that is selected.

Furthermore, according to the present invention, when the worm gear module is shipped, such worm gear is shipped without an output shaft protruding therefrom. Therefore, a shipping crate of smaller dimensions will adequately accommodate such worm gear.

Additionally, an end user of the worm gear according to the present invention is able to assemble the machinery together with a selected output shaft for driving the machinery. Also, the end user is able to stock a replacement standardized worm gear module according to the present invention so that when a worm gear is to be replaced, all that is required by the end user is an appropriate size adapter sleeve.

Another important feature of the present invention is relative to the output shaft and the manufacture thereof In known worm gears, the output shaft has been manufactured as an integral part of the worm gear. Accordingly, the output shaft is machined from materials that would permit the output shaft to be supported within the worm gear by taper bearings and the like. Also, the output shaft would be machined to accept the required bearing lubrication seals.

However, in the present invention, the drive of the worm gear is bearingly supported and the output shaft cooperates with such drive so that the output shaft does not require any bearing seals between the drive and the output shaft. Consequently, the output shaft may be machined from cold finished steel which not only increases the output shaft rating but also reduces the cost of manufacturing such shaft.

A further feature of the adapter device according to the present invention resides in the provision of the hollow cavity of the drive such that the end of the output shaft and sleeve may be inserted therein from either side. Alternatively, an output shaft can be mounted centrally within the drive so that the output shaft may be connected to machinery from both ends thereof.

Therefore, it is a primary feature of the present invention to provide an adapter device for adapting a drive of a worm gear to rotate an output shaft that overcomes the problems associated with the prior art arrangements.

Another feature of the present invention is the provision of an adapter device for adapting a drive of a worm gear to rotate an output shaft so that for a particular worm gear module, several different size output shafts may be driven dependent on the size of the sleeve that is selected.

A further feature of the present invention is the provision of an adapter device for adapting a drive of a worm gear to rotate an output shaft so that when the worm gear module is shipped, such worm gear is shipped without an output shaft protruding therefrom.

Yet another feature of the present invention is the provision of an adapter device for adapting a drive of a worm gear to rotate an output shaft so that a manufacturer of the machinery is able to assemble the machinery together with a selected output shaft for driving the machinery. A replacement for the worm gear can subsequently be ordered and installed using an appropriate size adapter sleeve.

Still a further feature of the present invention is the provision of an adapter device for adapting a drive of a worm gear to rotate an output shaft so that the output shaft may be machined from cold finished steel which not only increases the output shaft rating but also reduces the cost of manufacturing such shaft.

A further feature of the adapter device according to the present invention resides in the provision of the hollow cavity of the drive such that the end of the output shaft and sleeve may be inserted therein from either side.

Other features and advantages of the present invention will be readily apparent to those skilled in the art by a consideration of the detailed description of a preferred embodiment of the present invention contained herein.

SUMMARY OF THE INVENTION

The present invention relates to an adapter device for adapting a drive of a worm gear to rotate an output shaft. The adapter device includes a sleeve having an inside diameter which is slightly greater than an outside diameter of the output shaft. The sleeve has an outer diameter which is slightly less than an inner diameter of the drive of the worm gear. An elongate key cooperates with a longitudinal slot defined by the output shaft and an aligned channel defined by the sleeve and an aligned groove defined by the drive of the worm gear. The sleeve is disposed between the output shaft and the drive of the worm gear, the sleeve, the output shaft and the drive of the worm gear being coaxial relative to each other. The arrangement is such that when the drive of the worm gear rotates, the key interacts with the aligned groove of the drive of the worm gear, the channel of the sleeve and the longitudinal slot of the output shaft for rotating the output shaft.

In a more specific embodiment of the present invention, the sleeve is metallic and is fabricated from a composite ductile iron hub with a centrifugally cast bronze "ring" gear.

Moreover, the sleeve is of hollow cylindrical configuration, the sleeve having a first and a second end.

Preferably, the sleeve has a length within a range 4" to 6".

Furthermore, the sleeve defines a longitudinally extending bore for the reception therein of the output shaft, the bore extending from the first to the second end of the sleeve.

Also, the bore is of uniform diameter from the first to the second end of the sleeve.

More particularly, the bore has a diameter within a range 1.00" to 2.25".

Additionally, the elongate key is of rectangular shaped cross-sectional configuration.

In a preferred embodiment of the present invention, the elongate key is of square shaped cross-sectional configuration.

Also, the elongate key has a width within a range of 0.25" to 0.38" and a height between 0.25" to 0.62". Preferably, the width is 0.375" and the height is 0.500". The key also has a length which is slightly less than a length of the channel of the sleeve.

The longitudinal slot of the output shaft has a length which is approximately the same as the length of the channel of the sleeve such that in use of the adapter device, the output shaft is inserted into the sleeve until the channel of the sleeve is aligned with the longitudinal slot of the output shaft. The arrangement is such that insertion of the elongate key into the channel and the slot is permitted and so that subsequently, insertion of the assembled output shaft, key and sleeve into the drive of the worm gear is permitted with the key sliding longitudinally within the aligned groove of the drive of the worm gear.

Furthermore, the drive of the worm gear has a first and a second extremity, the groove extending between the first and second extremities of the drive and to at least one of the extremities of the drive so that during assembly, insertion of the output shaft, key and sleeve into the drive is permitted.

Also, a plurality of sleeves are provided according to the present invention so that each sleeve has an inside diameter of a different diameter in order to accommodate output shafts having various outside diameters.

The adapter device according to the present invention also includes a first and a second retaining clip. The clips are spaced relative to each other along the output shaft, the clips cooperating with the output shaft for locking the output shaft against axial movement within and relative to the drive of the worm gear.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

Included in such modifications would be the provision of a hydraulic motor or shaft for an electric motor mounted adjacent to one side only of the input. Therefore, only two threaded holes at the input would be required. In the case of a right hand worm gear, the output shaft is capped with end cap on the right hand side of the worm gear.

If a left hand worm gear is required, the output shaft is inserted through the output drive so that the output shaft extends from the left of the worm gear. An end cover is then secured to the left hand side of the worm gear.

The casing of the worm gear is drilled or cast with mounting bores with identical mounting bores on an opposed face of the casing so that when the casing is reversed, the worm gear can be mounted as either a left or a right hand module. By the aforementioned arrangement and uniform drilling pattern with the bores equally spaced relative to each other, a single worm gear module can function as a left or a right hand module or can be turned through 90 degrees or even 180 degrees thus reducing manufacturing costs and enabling an end user to stock such identical modules and use such interchangeable modules without modification in differing applications and configurations as needed.

Furthermore, according to the present invention, because of the provision of the adapter sleeves, the modules can be shipped to an end user without input or output shafts assembled and protruding therefrom. The absence of the input and output shafts for shipping greatly reduces the cost of shipping because as many as 50 modules can be transported in a transportation crate that would only be capable of transporting 20 modules assembled with input and output shafts.

Additionally, according to the present invention, an end user requires less storage space to stock a supply of modules and each module can be used for various applications as needed with the end user if necessary using existing input and output shafts together with an appropriately sized adapter kit according to the present invention to link a newly installed module to the input and output shafts.

By the provision of the reversible drilling pattern of the worm gear casing, the worm gear can be mounted in various positions with the worm over or under and with the input vertical or the output drive disposed vertically.

Because the worm gear according to the present invention can be mounted in a plurality of different dispositions, the casing of the worm gear includes a plurality of bores with corresponding plugs. The arrangement is such that according to the fitted disposition of the worm gear, the casing of the worm gear can be filled to the corresponding bores with lubricating oil and then plugged thus assuring an appropriate lubrication level of the oil for the worm gear mechanism. Vent holes are also provided in order to accommodate the disposition of the worm gear when fitted in a particular configuration.

BRIEF DESCRIPTION OF THE DRAWINGS

Similar reference characters refer to similar parts throughout the various views and embodiments of the drawings.

DETAILED DESCRIPTION OF THE DRAWINGS

Figure 1:
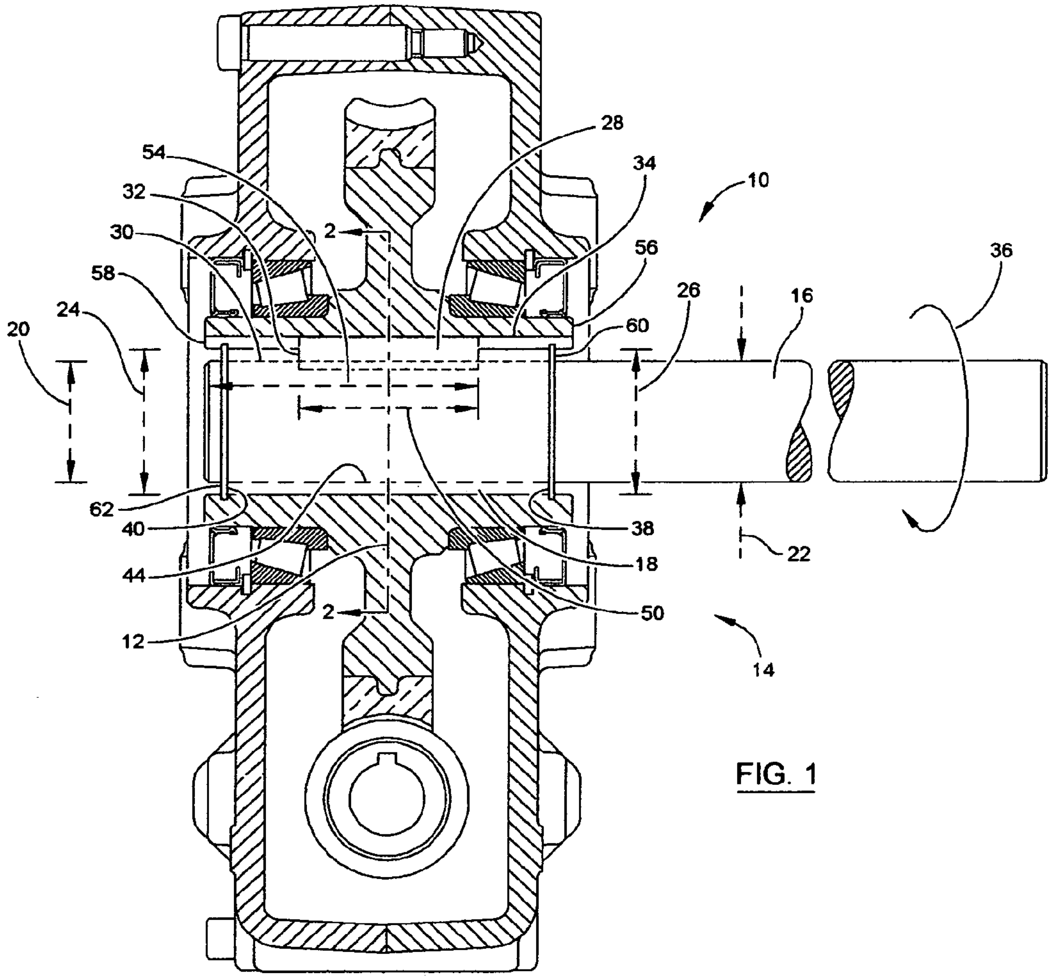
FIG. 1 is a side elevational view, partially in section, of an adapter device according to the present invention for adapting a drive of a worm gear to rotate an output shaft.

FIG. 1 is a side elevational view, partially in section, of an adapter device generally designated 10 according to the present invention for adapting a drive 12 of a worm gear generally designated 14 to rotate an output shaft 16. The adapter device 10 includes a sleeve 18 having an inside diameter 20 which is slightly greater than an outside diameter 22 of the output shaft 16. The sleeve 18 has an outer diameter 24 which is slightly less than an inner diameter 26 of the drive 12 of the worm gear 14. An elongate key 28 cooperates with a longitudinal slot 30 defined by the output shaft 16 and an aligned channel 32 defined by the sleeve 18 and an aligned groove 34 defined by the drive 12 of the worm gear 14. The sleeve 18 is disposed between the output shaft 16 and the drive 12 of the worm gear 14, the sleeve 18, the output shaft 16 and the drive 12 of the worm gear 14 being coaxial relative to each other. The arrangement is such that when the drive 12 of the worm gear 14 rotates as indicated by the arrow 36, the key 28 interacts with the aligned groove 34 of the drive 12 of the worm gear 14, the channel 32 of the sleeve 18 and the longitudinal slot 30 of the output shaft 16 for rotating the output shaft 16.

In a more specific embodiment of the present invention, the sleeve 18 is metallic and is fabricated from a composite ductile iron hub with a centrifugally cast bronze "ring" gear.

Moreover, the sleeve 18 is of hollow cylindrical configuration, the sleeve 18 having a first and a second end 38 and 40 respectively.

Preferably, the sleeve 18 has a length 42 within a range 4" to 6".

Furthermore, the sleeve 18 defines a longitudinally extending bore 44 for the reception therein of the output shaft 16, the bore 44 extending from the first end 38 to the second end 40 of the sleeve 18.

Also, the bore 44 is of uniform diameter from the first to the second end 38 and 40 respectively of the sleeve 18.

More particularly, the bore 44 has a diameter 46 within a range 1.00" to 2.25".

Additionally, the elongate key 28 is of rectangular shaped cross-sectional configuration.

In a preferred embodiment of the present invention, the elongate key 28 is of square shaped cross-sectional configuration.

Figure 2:
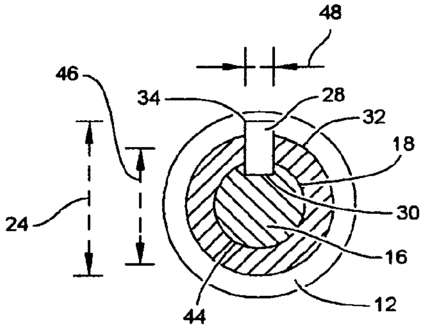
FIG. 2 is a sectional view taken on the line 2—2 of FIG. 1.

FIG. 2 is a sectional view taken on the line 2—2 of FIG. 1. As shown in FIG. 2, the elongate key 28 has a width 48 within a range 0.25" to 0.38" and has a length 50 which is slightly less than a length 52 of the channel 32 of the sleeve 18.

As shown in FIG. 1, the longitudinal slot 30 of the output shaft 16 has a length 54 which is approximately the same as the length 52 of the channel 32 of the sleeve 18 or, as shown in FIG. 1, the length 54 is longer than the length 52 of the key 28. The arrangement is such that in use of the adapter device 10, the output shaft 16 is inserted into the sleeve 18 until the channel 32 of the sleeve 18 is aligned with the longitudinal slot 30 of the output shaft 16. The arrangement is such that insertion of the elongate key 28 into the channel 32 and the slot 30 is permitted and so that subsequently, insertion of the assembled output shaft 16, key 28 and sleeve 18 into the drive 12 of the worm gear 14 is permitted with the key 28 sliding longitudinally within the aligned groove 34 of the drive 12 of the worm gear 14.

Furthermore, the drive 12 of the worm gear 14 has a first and a second extremity 56 and 58 respectively, the groove 34 extending between the first and second extremities 56 and 58 respectively of the drive 12 and to at least one of the extremities 56 or 58 of the drive 12 so that during assembly, insertion of the output shaft 16, key 28 and sleeve 18 into the drive 12 is permitted.

Also, a plurality of sleeves are provided according to the present invention so that each sleeve 18 has an inside diameter 20 of a different diameter in order to accommodate output shafts 16 having various outside diameters 22.

The adapter device 10 according to the present invention also includes a first and a second retaining clip 60 and 62 respectively. The clips 60 and 62 are spaced relative to each other along the output shaft 16, the clips 60 and 62 cooperating with the output shaft 16 for locking the output shaft 16 against axial movement within and relative to the drive 12 of the worm gear 14.

Figure 3:
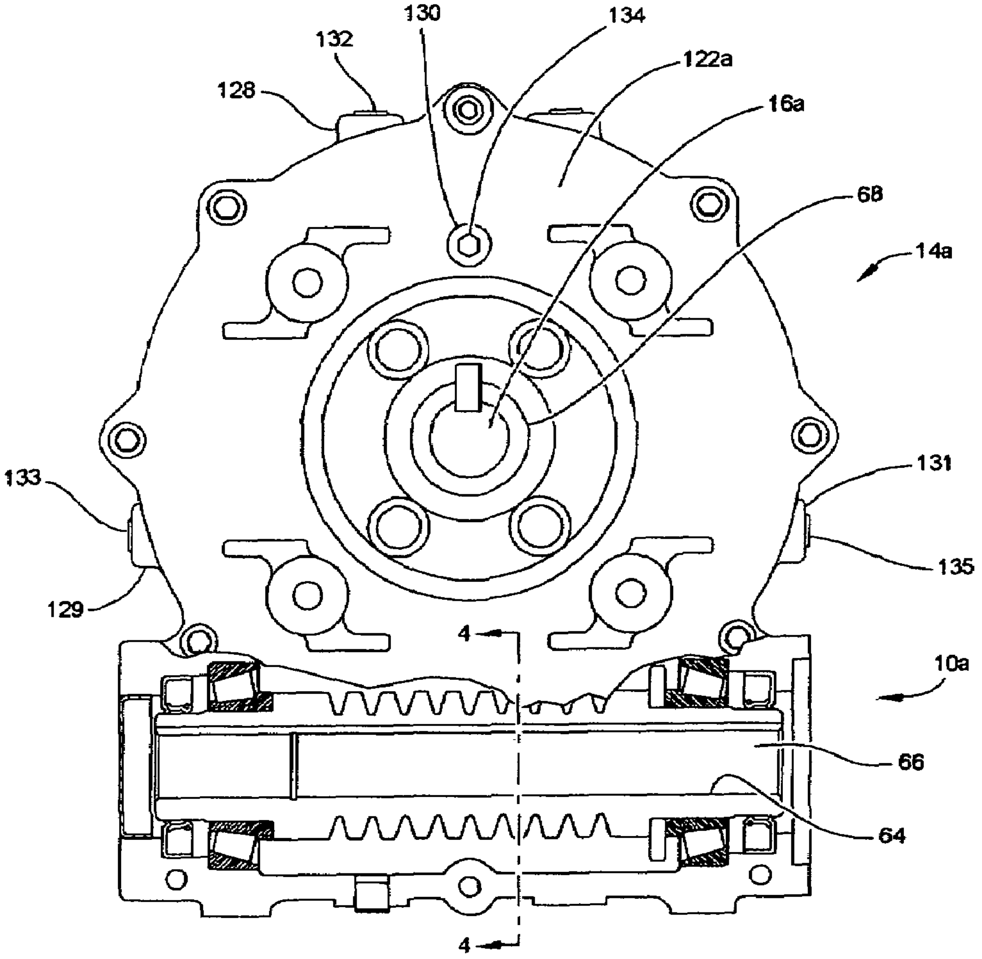
FIG. 3 is a front view of a further embodiment of the present invention.

FIG. 3 is a front view of a further embodiment of the present invention. As shown in FIG. 3, an adapter device 10*a* is provided for adapting a worm gear 14*a* having an input 64 for receiving therein an input shaft 66 and an output drive 68 for receiving therein an output shaft 16*a*.

Figure 4:
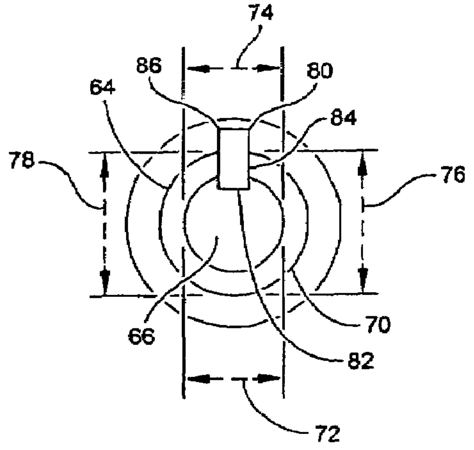
FIG. 4 is a sectional view taken on the line 4—4 of FIG. 3.

FIG. 4 is a sectional view taken on the line 4—4 of FIG. 3. As shown in FIG. 4, the adapter device 10*a* includes a sleeve 70 having an inside diameter 72 which is slightly greater than an outside diameter 74 of the input shaft 66. The sleeve 70 has an outer diameter 76 which is slightly less than an inner diameter 78 of the input 64 of the worm gear 14*a*.

Also, an elongate key 80 cooperates with a longitudinal slot 82 defined by the input shaft 66 10 and an aligned channel 84 defined by the sleeve 70 and an aligned groove 86 defined by the input 64 of the worm gear 14*a*. The sleeve 70 is disposed between the input shaft 66 and the input 64 of the worm gear 14*a*. The sleeve 70, the input shaft 66 and the input 64 of the worm gear 14*a* are disposed coaxial relative to each other. The arrangement is such that when the input shaft 66 rotates, the key 80 interacts with, the aligned groove 86 of the input 64 of the worm gear 14*a*, the channel 84 of the sleeve 70 and the longitudinal slot 82 of the input shaft 66 for rotating the input 64.

Figure 5:
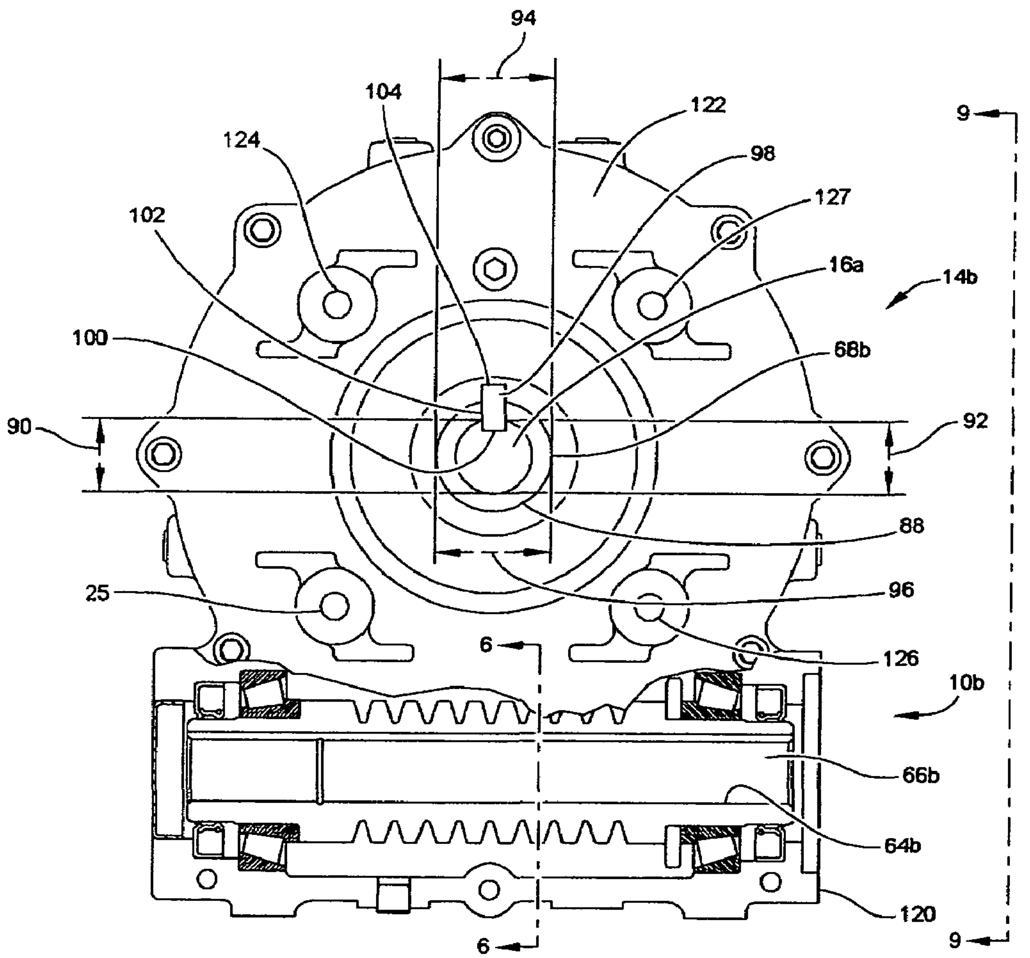
FIG. 5 is a front view of yet another embodiment of the present invention.

FIG. 5 is a front view of yet another embodiment of the present invention. As shown in FIG. 5, an adapter device 10*b* is provided for adapting a worm gear 14*b* having an input 64*b* for receiving therein an input shaft 66*b* and an output drive 68*b* for receiving therein an output shaft 16*b*.

Figure 6:
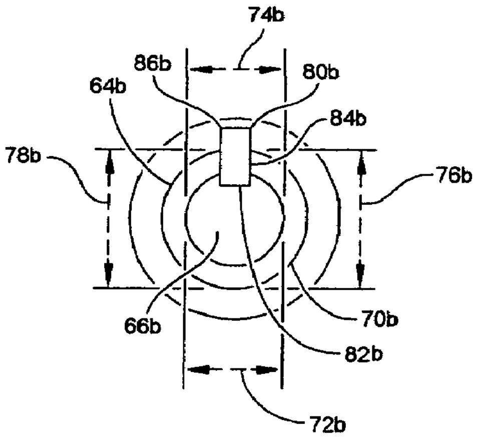
FIG. 6 is a sectional view taken on the line 6—6 of FIG. 5.

FIG. 6 is a sectional view taken on the line 6—6 of FIG. 5. As shown in FIG. 6, the adapter device 10*b* includes a sleeve 70*b* having an inside diameter 72*b* which is slightly greater than an outside diameter 74*b* of the input shaft 66*b*, the sleeve 70*b* having an outer diameter 74*b* which is slightly less than an inner diameter 78*b* of the input 64*b* of the worm gear 14*b*.

Also, an elongate key 80*b* cooperates with a longitudinal slot 82*b* defined by the input shaft 66*b* and an aligned channel 84*b* defined by the sleeve 70*b* and an aligned groove 86*b* defined by the input 64*b* of the worm gear 14*b*. The sleeve 70*b* is disposed between the input shaft 66*b* and the input 64*b* of the worm gear 14*b*. The sleeve 70*b*, the input shaft 66*b* and the input 64*b* of the worm gear 14*b* are disposed coaxial relative to each other. The arrangement is such that when the input shaft 66*b* rotates, the key 80*b* interacts with, the aligned groove 86*b* of the input 64*b* of the worm gear 14*b*, the channel 84*b* of the sleeve 70*b* and the longitudinal slot 82*b* of the input shaft 66*b* for rotating the input 64*b*.

Additionally, as shown in FIG. 5, a further sleeve 88 has an inside diameter 90 which is slightly greater than an outside diameter 92 of the output shaft 16*b*. The further sleeve 88 has an outer diameter 94 which is slightly less than an inner diameter 96 of the output drive 68*b* of the worm gear 14*b*.

Furthermore, a further elongate key 98 cooperates with a further longitudinal slot 100 defined by the output shaft 16*b* and an aligned further channel 102 defined by the further sleeve 88 and an aligned further groove 104 defined by the output drive 68*b* of the worm gear 14*b*. The further sleeve 88 is disposed between the output shaft 16*b* and the output drive 68*b* of the worm gear 14*b*. The further sleeve 88, the output shaft 16*b* and the output drive 68*b* of the worm gear 14*b* are disposed coaxial relative to each other. The arrangement is such that when the output drive 68*b* of the worm gear 14*b* rotates, the further key 98 interacts with, the aligned further groove 104 of the output drive 68*b* of the worm gear 14*b*, the further channel 102 of the further sleeve 88 and the further longitudinal slot 100 of the output shaft 16*b* for rotating the output shaft 16*b*.

In the arrangement shown in both FIGS. 3 to 5, the input shaft 66, 66*b* can be the shaft of hydraulic motor. Alternatively, the input shaft 66, 66*b* could be a shaft having secured thereto a sheave or sprocket so that the input shaft 66, 66*b* could be driven by an electric motor or the like.

Figure 7:
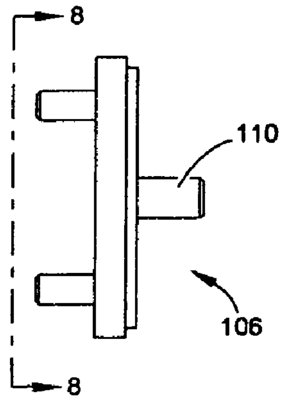
FIG. 7 is front view of a mounting bracket according to the present invention.

FIG. 7 is side elevational view of a mounting bracket generally designated 106 according to the present invention.

Figure 8:
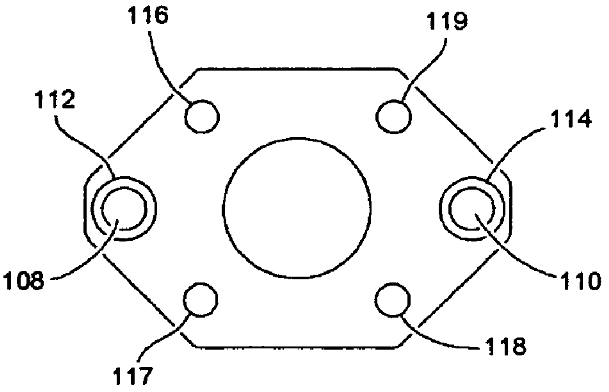
FIG. 8 is a view taken on the line 8—8 of FIG. 7.

FIG. 8 is a view taken on the line 8—8 of FIG. 7. As shown in FIG. 8, the mounting bracket 106 is mounted adjacent to the input 64*b* by two bolts 108 and 110 respectively. The bracket 106 includes two bolt holes 112 and 114 respectively for receiving therein the mounting bolts 108 and 110 respectively so that mounting a 4-bolt type hydraulic motor is permitted. In the assembly of the bracket 106, the bracket 106 is mounted on the hydraulic motor (not shown) by four bolts which extend through bolt holes 116, 117, 118 and 119 respectively defined by the bracket 106.

Figure 9:
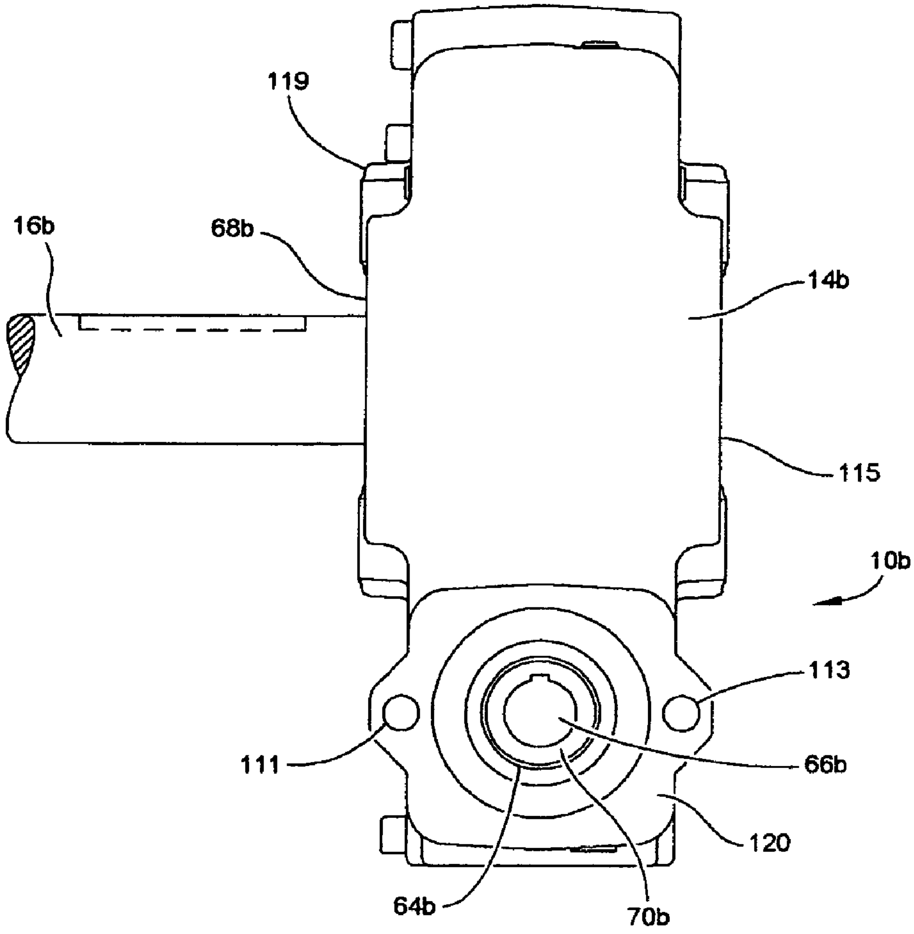
FIG. 9 is a view taken on the line 9—9 of FIG. 5.

FIG. 9 is a view taken on the line 9—9 of FIG. 5. As shown in FIGS. 7–9, the assembled bracket 106 and hydraulic motor are then secured to the worm gear 14*b* adjacent to the input 64*b* thereof by the two mounting bolts 108 and 110. More particularly, the bolts 108 and 110 cooperate with aligned threaded holes 111 and 113 defined by the worm gear 14*b* adjacent to the input 64*b* thereof.

Alternatively, when a standard 2-bolt type hydraulic motor is to be mounted to the worm gear 14*b*, no mounting bracket is required. Rather, the hydraulic motor is directly mounted adjacent to the input 64*b* of the worm gear 14*b* by the two bolts 108 and 110 which extend through two mounting holes provided in a standard hydraulic motor and the aligned corresponding threaded holes 111 and 113 of the worm gear 14*b*.

Additionally, as shown in FIG. 5, with regard to the input 64*b*, the hydraulic motor or shaft for an electric motor is mounted adjacent to one side 120 only of the input 64*b*. Therefore, only two threaded holes 111 and 113 at the input 64*b* are required. In the case of a right hand worm gear, as shown in FIG. 9, the output shaft 16*b* is capped with end cap 115 on the right hand side of the worm gear 14*b* as shown in FIG. 9.

Figure 10:
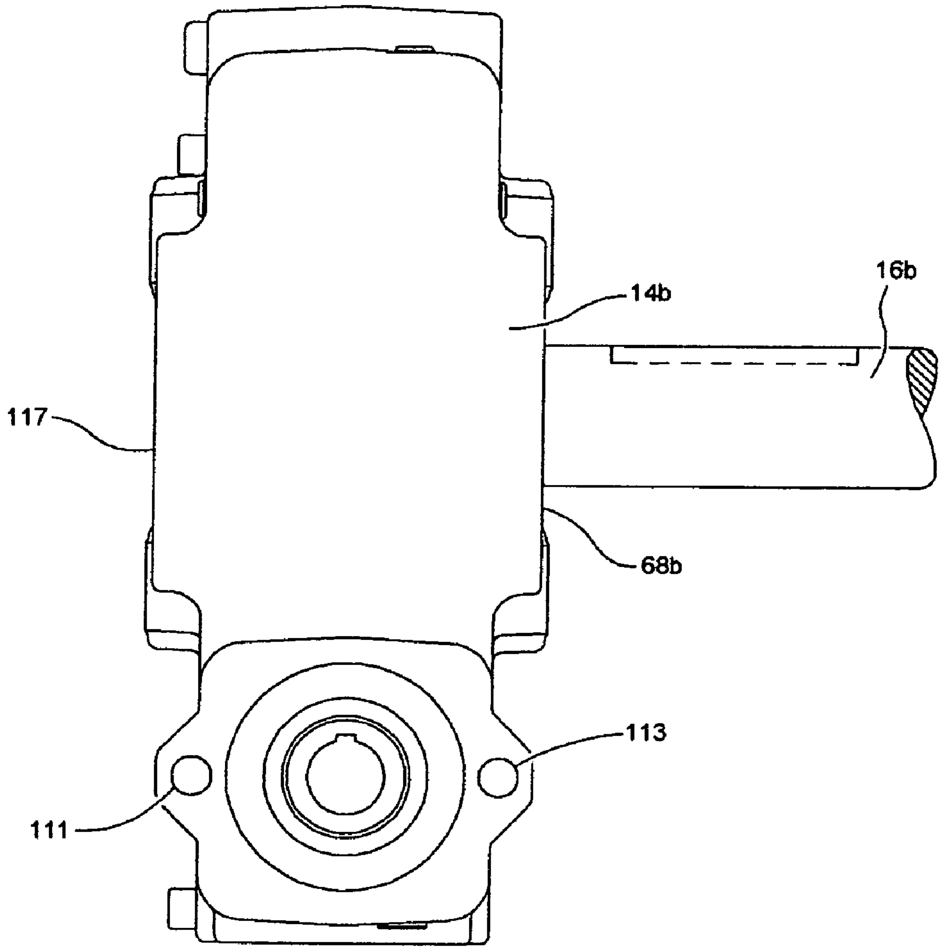
FIG. 10 is a side elevational view of a left hand worm gear according to the present invention.

FIG. 10 is a side elevational view of a left hand worm gear. As shown in FIG. 10, if a left hand worm gear is required as shown in FIG. 1, the shaft 16*b* is inserted through the output drive 68*b* so that the output shaft 16*b* extends from the right hand side of the worm gear 14*b*. An end cover 117 as shown in FIG. 10 is then secured to the left hand side of the worm gear.

As shown in FIG. 5, a casing 122 of the worm gear 14*b* is drilled or cast with mounting bores 124, 125, 126 and 127 with identical mounting bores on an opposed face 119 of the casing 122 so that when the casing 122 is reversed, the worm gear 14 can be mounted as either a left or a right hand module. By the aforementioned arrangement and the uniform drilling pattern as shown in FIG. 5 with the bores 124–127 equally spaced relative to each other, a single worm gear module can function as a left or a right hand module or can be turned through 90 degrees or even 180 degrees. Such standardizing of the module reduces manufacturing costs and enables an end user to stock such identical modules and use such interchangeable modules without modification in differing applications and configurations as needed.

Furthermore, according to the present invention, because of the provision of the adapter sleeves 18, 70 and 88, the modules can be shipped to an end user without input or output shafts 66 and 16 respectively assembled and protruding therefrom. The absence of the input and output shafts 66 and 16 for shipping greatly reduces the cost of shipping because as many as 50 modules can be transported in a transportation crate that would only be capable of transporting 20 modules assembled with input and output shafts.

Additionally, according to the present invention, an end user requires less storage space to stock a supply of modules. Furthermore, each module can be used for various applications as needed with the end user if necessary using existing input and output shafts together with an appropriately sized adapter kit according to the present invention to link a newly installed module to the input and output shafts.

By the provision of the reversible drilling pattern of the worm gear casing 122, the worm gear can be mounted in various positions with the worm over or under and with the input vertical or the output drive disposed vertically.

As shown in FIG. 3, because the worm gear according to the present invention can be mounted in a plurality of different dispositions, the casing 122*a* of the worm gear includes a plurality of bores 128, 129, 130 and 131 with corresponding plugs 132, 133, 134 and 135 so that according to the fitted disposition of the worm gear 14*a*, the casing 122*a* of the worm gear can be filled to the corresponding bores 128, 129, 130 or 131 with lubricating oil and then plugged thus assuring an appropriate lubrication level of the oil for the worm gear mechanism. Vent holes are also provided in order to accommodate the disposition of the worm gear when fitted in a particular configuration.

Figure 11:
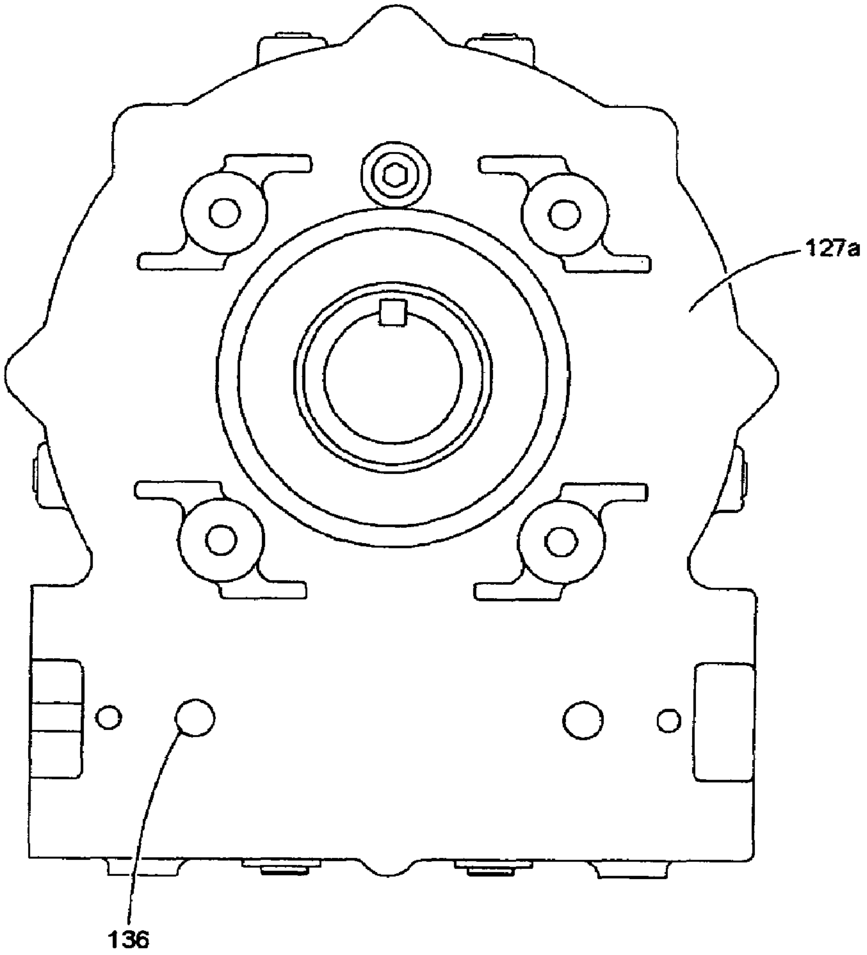
FIG. 11 is a front view of the casing of the worm gear shown in FIG. 3.

FIG. 11 is a front view of the casing shown in FIG. 3. As shown in FIG. 11, the casing 122*a* defines a plugged port 136 for the insertion therein of a magnetic pick-up sensor to detect the rotation of the input 64 when rotating.

In operation of the adapter device according to the present invention, the sleeve 18 is slipped over the end of the output shaft 16 until the slot 30 and channel 32 are aligned. The key 28 is then inserted and the shaft 16 and sleeve assembly is inserted from either side of the worm gear 14 as required so that the key slides longitudinally along the groove 34. The retaining clips 60 and 62 are then inserted for locking the output shaft 16 to the drive 12.

What is claimed is:

1. An adapter device for adapting a drive of a worm gear to rotate an output shaft, said adapter device comprising:

a sleeve having an inside diameter slightly greater than an outside diameter of the output shaft, said sleeve having an outer diameter which is slightly less than an inner diameter of the drive of the worm gear;

an elongate key cooperating with a longitudinal slot defined by the output shaft and an aligned channel defined by said sleeve and an aligned groove defined by the drive of the worm gear, said sleeve being disposed between the output shaft and the drive of the worm gear, said sleeve, the output shaft and the drive of the worm gear being coaxial relative to each other so that when the drive of the worm gear rotates, said key interacts with, said aligned groove of the drive of the worm gear, said channel of said sleeve and said longitudinal slot of the output shaft for rotating the output shaft; and a plurality of sleeves, each sleeve of said plurality of sleeves having said inside diameter of a different diameter in order to accommodate output shafts having various outside diameters.

2. An adapter device as set forth in claim 1 wherein said sleeve is metallic.

3. An adapter device as set forth in claim 1 wherein said sleeve is of hollow cylindrical configuration, said sleeve having a first and a second end.

4. An adapter device as set forth in claim 1 wherein said elongate key is of rectangular shaped cross-sectional configuration.

5. An adapter device as set forth in claim 1 wherein said elongate key is of square shaped cross-sectional configuration.

6. An adapter device as set forth in claim 1 wherein said elongate key has a length which is slightly less than a length of said channel of said sleeve.

7. An adapter device as set forth in claim 1 further including:

a first and a second retaining clip, said clips being spaced relative to each other along the output shaft, said clips cooperating with the output shaft for locking the output shaft against axial movement within and relative to the drive of the worm gear.

8. An adapter device as set forth in claim 3 wherein said sleeve has a length within a range 4" to 6".

9. An adapter device as set forth in claim 3 wherein said sleeve defines a longitudinally extending bore for the reception therein of the output shaft, said bore extending from said first to said second end of said sleeve.

10. An adapter device as set forth in claim 9 wherein said bore is of uniform diameter from said first to said second end of said sleeve.

11. An adapter device as set forth in claim 10 wherein said bore has a diameter within a range 1.00" to 2.25".

12. An adapter device as set forth in claim 5 wherein said elongate key has a width within a range of 0.25" to 0.38" and a height between 0.25" to 0.62".

13. An adapter device for adapting a drive of a worm gear to rotate an output shaft, said adapter device comprising:

a sleeve having an inside diameter slightly greater than an outside diameter of the output shaft, said sleeve having an outer diameter which is slightly less than an inner diameter of the drive of the worm gear;

an elongate key cooperating with a longitudinal slot defined by the output shaft and an aligned channel defined by said sleeve and an aligned groove defined by the drive of the worm gear, said sleeve being disposed between the output shaft and the drive of the worm gear, said sleeve, the output shaft and the drive of the worm gear being coaxial relative to each other so that when the drive of the worm gear rotates, said key interacts with, said aligned groove of the drive of the worm gear, said channel of said sleeve and said longitudinal slot of the output shaft, said groove, said channel and said slot being aligned relative to each other for the reception therein of said key for rotating the output shaft; and said sleeve is fabricated from bronze.

14. An adapter device for adapting a drive of a worm gear to rotate an output shaft, said adapter device comprising:

a sleeve having an inside diameter slightly greater than an outside diameter of the output shaft, said sleeve having an outer diameter which is slightly less than an inner diameter of the drive of the worm gear;

an elongate key cooperating with a longitudinal slot defined by the output shaft and an aligned channel defined by said sleeve and an aligned groove defined by the drive of the worm gear, said sleeve being disposed between the output shaft and the drive of the worm gear, said sleeve, the output shaft and the drive of the worm gear being coaxial relative to each other so that when the drive of the worm gear rotates, said key interacts with, said aligned groove of the drive of the worm gear, said channel of said sleeve and said longitudinal slot of the output shaft for rotating the output shaft;

said elongate key has a length which is slightly less than a length of said channel of said sleeve; and said longitudinal slot of said output shaft has a length which is greater than the length of said channel of said sleeve such that in use of said adapter device, the output shaft is inserted into said sleeve until said channel of said sleeve is aligned with said longitudinal slot of said output shaft so that insertion of said elongate key into said channel and said slot is permitted and so that subsequently, insertion of the assembled output shaft, key and sleeve into the drive of the worm gear is permitted with said key sliding longitudinally within said aligned groove of the drive of the worm gear.

15. An adapter device for adapting a drive of a worm gear to rotate an output shaft, said adapter device comprising:

a sleeve having an inside diameter slightly greater than an outside diameter of the output shaft, said sleeve having an outer diameter which is slightly less than an inner diameter of the drive of the worm gear;

an elongate key cooperating with a longitudinal slot defined by the output shaft and an aligned channel defined by said sleeve and an aligned groove defined by the drive of the worm gear, said sleeve being disposed between the output shaft and the drive of the worm gear, said sleeve, the output shaft and the drive of the worm gear being coaxial relative to each other so that when the drive of the worm gear rotates, said key interacts with, said aligned groove of the drive of the worm gear, said channel of said sleeve and said longitudinal slot of the output shaft for rotating the output shaft; and the drive of the worm gear has a first and a second extremity, said groove extending between said first and second extremities of the drive and to at least one of said extremities of the drive so that during assembly, insertion of the output shaft, key and sleeve into the drive is permitted.

16. An adapter device for adapting a drive of a worm gear to rotate an output shaft, said adapter device comprising:

a sleeve having an inside diameter slightly greater than an outside diameter of the output shaft, said sleeve having an outer diameter which is slightly less than an inner diameter of the drive of the worm gear;

an elongate key cooperating with a longitudinal slot defined by the output shaft and an aligned channel defined by said sleeve and an aligned groove defined by the drive of the worm gear, said sleeve being disposed between the output shaft and the drive of the worm gear, said sleeve, the output shaft and the drive of the worm gear being coaxial relative to each other so that when the drive of the worm gear rotates, said key interacts with, said aligned groove of the drive of the worm gear, said channel of said sleeve and said longitudinal slot of the output shaft for rotating the output shaft; and a plurality of sleeves are provided each sleeve having said inside diameter of a different diameter in order to accommodate output shafts having various outside diameters.

17. An adapter device for adapting a drive of a worm gear to rotate an output shaft, said adapter device comprising:

a sleeve having an inside diameter slightly greater than an outside diameter of the output shaft, said sleeve having an outer diameter which is slightly less than an inner diameter of the drive of the worm gear;

an elongate key cooperating with a longitudinal slot defined by the output shaft and an aligned channel defined by said sleeve and an aligned groove defined by the drive of the worm gear, said sleeve being disposed between the output shaft and the drive of the worm gear, said sleeve, the output shaft and the drive of the worm gear being coaxial relative to each other so that when the drive of the worm gear rotates, said key interacts with, said aligned groove of the drive of the worm gear, said channel of said sleeve and said longitudinal slot of the output shaft for rotating the output shaft;

said sleeve being metallic;

said sleeve being of hollow cylindrical configuration, said sleeve having a first and a second end;

said sleeve defining a longitudinally extending bore for the reception therein of the output shaft, said bore extending from said first to said second end of said sleeve;

said bore being of uniform diameter from said first to said second end of said sleeve;

said elongate key being of rectangular shaped cross-sectional configuration;

said elongate key having a length which is slightly less than a length of said channel of said sleeve;

said longitudinal slot of said output shaft has a length which is approximately the same as the length of said channel of said sleeve such that in use of said adapter device, the output shaft is inserted into said sleeve until said channel of said sleeve is aligned with said longitudinal slot of said output shaft so that insertion of said elongate key into said channel and said slot is permitted and so that subsequently, insertion of the assembled output shaft, key and sleeve into the drive of the worm gear is permitted with said key sliding longitudinally within said aligned groove of the drive of the worm gear;

the drive of the worm gear having a first and a second extremity, said groove extending between said first and second extremities of the drive and to at least one of said extremities of the drive so that during assembly, insertion of the output shaft, key and sleeve into the drive is permitted;

a plurality of sleeves, each sleeve of said plurality of sleeves having said inside diameter of a different diameter in order to accommodate output shafts having various outside diameters; and a first and a second retaining clip, said clips being spaced relative to each other along the output shaft, said clips cooperating with the output shaft for locking the output shaft against axial movement within and relative to the drive of the worm gear.

18. An adapter device for adapting a worm gear having an input for receiving therein an input shaft and an output drive for receiving therein an output shaft, said adapter device comprising:

a sleeve having an inside diameter slightly greater than an outside diameter of the input shaft, said sleeve having an outer diameter which is slightly less than an inner diameter of the input of the worm gear;

an elongate key cooperating with a longitudinal slot defined by the input shaft and an aligned channel defined by said sleeve and an aligned groove defined by the input of the worm gear, said sleeve being disposed between the input shaft and the input of the worm gear, said sleeve, the input shaft and the input of the worm gear being coaxial relative to each other so that when the input shaft rotates, said key interacts with, said aligned groove of the input of the worm gear, said channel of said sleeve and said longitudinal slot of the input shaft for rotating the input;

a further sleeve having an inside diameter slightly greater than an outside diameter of the output shaft, said further sleeve having an outer diameter which is slightly less than an inner diameter of the output drive of the worm gear; and a further elongate key cooperating with a further longitudinal slot defined by the output shaft and an aligned further channel defined by said further sleeve and an aligned further groove defined by the output drive of the worm gear, said further sleeve being disposed between the output shaft and the output drive of the worm gear, said further sleeve, the output shaft and the output drive of the worm gear being coaxial relative to each other so that when the output drive of the worm gear rotates, said further key interacts with, said aligned further groove of the output drive of the worm gear, said further channel of said further sleeve and said further longitudinal slot of the output shaft for rotating the output shaft.

19. An adapter device as set forth in claim 18 further including:

a casing defining a first and a second threaded hole disposed adjacent to said input;

a mounting bracket disposed adjacent to said input;

said bracket defining a first and a second hole aligned with said first and second threaded holes of said casing;

said bracket defining a plurality of bolt holes such that when said bracket has been bolted through said plurality of bolt holes to a hydraulic motor, said bracket is then secured to said casing by being bolted to the casing through said first and second hole defined by said bracket.

20. An adapter device as set forth in claim 18 further including:

a casing for the worm gear, said casing defining a plurality of mounting bores, each mounting bore being equally spaced from an adjacent mounting bore so that said casing can be mounted in various dispositions.

21. An adapter device as set forth in claim 20 wherein said casing defines a further plurality of mounting bores, said further bores being disposed on an opposed face of said casing relative to said plurality of mounting bores, each mounting bore being equally spaced from an adjacent mounting bore so that mounting said worm gear as both a left hand and a right hand worm gear is permitted.

* * * * *